US006822835B2

(12) United States Patent
Kim

(10) Patent No.: US 6,822,835 B2
(45) Date of Patent: Nov. 23, 2004

(54) ACTUATOR LATCH OF HARD DISK DRIVE

(75) Inventor: Do-wan Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 70 days.

(21) Appl. No.: 10/288,506

(22) Filed: Nov. 6, 2002

(65) Prior Publication Data

US 2003/0086209 A1 May 8, 2003

(30) Foreign Application Priority Data

Nov. 6, 2001 (KR) ........................................ 2001-68817

(51) Int. Cl.[7] .................................................. G11B 5/54

(52) U.S. Cl. ................................. 360/256.2; 360/256.3

(58) Field of Search ............................. 360/256, 256.2, 360/256.3, 256.4

(56) References Cited

U.S. PATENT DOCUMENTS

| | | | | | |
|---|---|---|---|---|---|
| 5,208,713 | A | * | 5/1993 | Lindsay et al. | 360/256.3 |
| 5,216,662 | A | * | 6/1993 | Stefansky et al. | 369/215 |
| 5,381,290 | A | | 1/1995 | Cheng | |
| 5,495,376 | A | * | 2/1996 | Wasson et al. | 360/75 |
| 5,671,104 | A | * | 9/1997 | Takahashi et al. | 360/256.3 |
| 5,694,271 | A | * | 12/1997 | Stefansky | 360/256.3 |
| 6,147,841 | A | * | 11/2000 | Rao | 360/256.2 |
| 6,381,103 | B1 | * | 4/2002 | Misso et al. | 360/256.2 |
| 6,501,624 | B1 | * | 12/2002 | Gillis et al. | 360/256.3 |
| 6,535,357 | B1 | * | 3/2003 | Misso et al. | 360/256.2 |
| 2002/0149882 | A1 | * | 10/2002 | Williams et al. | 360/256 |

FOREIGN PATENT DOCUMENTS

| | | | |
|---|---|---|---|
| JP | 4-26969 | * | 1/1992 |
| JP | 2000-251424 | | 9/2000 |

OTHER PUBLICATIONS

IBM Technical Disclosure Bulletin, "A Bistable, Zero Steady State Power, Rotary–Actuator Lock for DASD", vol. 36, issue No. 3, pp. 7–10, published Mar. 1, 1993.*

* cited by examiner

*Primary Examiner*—David Ometz
(74) *Attorney, Agent, or Firm*—Staas & Halsey LLP

(57) ABSTRACT

An actuator latch of a hard disk drive. The actuator latch includes a locking protrusion installed at the actuator and a latch member rotatably installed on the basis of a predetermined rotation axis. The latch member rotates with the rotation of the actuator when the magnetic head is parked so that a hook intercepts the locking protrusion and prevents it from moving in an opposite direction to a parking direction. Also provided is a latch member driving unit including a lever installed at the latch member to be joined with a yoke of the voice coil motor by a magnetic force when intercepting the moving path of the locking protrusion and a coil to form the same polarity as the yoke with current supplied by a power supply installed at the level. The latch member driving unit rotates the latch member to set free the interception of the movement path of the locking protrusion by the hook. The latch member selectively intercepts the movement of the locking protrusion at the actuator so that the actuator is locked and unlocked. As a result, the actuator can remain stably locked and be softly unlocked without any impact.

17 Claims, 5 Drawing Sheets

ACTUATOR LATCH OF HARD DISK DRIVE

CROSS-REFERENCE TO RELATED APPLICATIONS

This application claims the benefit of Korean Application No. 2001-68817, filed Nov. 6, 2001, in the Korean Intellectual Property Office, the disclosure of which is incorporated herein by reference.

BACKGROUND OF THE INVENTION

1. Field of the Invention

The present invention relates to an actuator latch of a hard disk drive to lock a magnetic head in a parking region in a magnetic head transfer mechanism of the hard disk drive.

2. Description of the Related Art

In general, as shown in FIG. 1, a hard disk drive includes a hard disk 20 and a magnetic head transfer mechanism. The hard disk 20, in which predetermined data is recorded, is rotatably installed on a base 10. The transfer mechanism transfers a magnetic head 50 to a desired track on the hard disk 20 to record and reproduce data. Here, the hard disk 20 is divided into a recording region 22 to record data and a parking region 21 on which the magnetic head 50 arrives when the rotation of the hard disk 20 stops. The magnetic transfer mechanism includes an actuator 30, a voice coil motor, and a latch. The actuator 30, in which the magnetic head 50 is installed, rotates around a rotating axis 34 on the base 10. The voice coil motor rotates the actuator 30 with an electromagnetic force. The latch locks the actuator 30 after the magnetic head 50 arrives in the parking region 21. The actuator 30 includes a suspension portion 31, an arm 32, and a bobbin 33. The suspension portion 31 suspends the magnetic head 50. The arm 32 is rotatably connected with the rotating axis 34. A movable coil 35 of the voice coil motor is wound around the bobbin 33 . The voice coil motor includes the movable coil 35 and a magnet 41, which is attached to the yoke 40 installed on the base 10 and generates a magnetic flux. The actuator 30 is placed between a pair of the yokes 40, not shown in FIG. 1. An electromagnetic force occurs due to the interaction between the magnetic force flux generated by the magnet 41 and current flowing through the movable coil 35. As a result, the actuator 30 rotates in a direction according to Fleming's left-hand law. The latch locks the actuator 30 so that the actuator 30 does not move after the magnetic head 50 arrives in the parking region 21 as described previously. The latch includes a magnetic member 43, a damper 60, and an iron separation element 61. The magnetic member 43 is installed on the yoke 40 and magnetized by the magnet 41. The damper 60 is inserted into a combination protrusion 36 at the end of the bobbin 33 of the actuator 30. The iron separation element 61 is coupled to an end of the damper 60. Thus, if the actuator 30 rotates and the magnetic head 50 installed at the suspension portion 31 enters the parking region 21 of the hard disk 20, the iron separation element 61, coupled to one side of the bobbin 33, sticks to the magnetic member 43 as shown in FIG. 1. The actuator 30 remains locked due to the magnetic combination of the iron separation element 61 and the magnetic member 43 until the electromagnetic force to rotate the actuator 30 operates again.

The reason to lock the actuator 30 will be described below. The suspension portion 31 to suspend the magnetic head 50 provides an elastic force biasing the magnetic head 50 toward the horizontal plane of the hard disk 20. Thus, the magnetic head 50, to which an external force is not applied, keeps closely sticking on the horizontal plane of the hard disk 20. However, if the rotation of the hard disk 20 begins, air moves around the magnetic head 50 due to the rotation of the hard disk 20. The movement of air generates a lift force that lifts the magnetic head 50 from the horizontal plane of the hard disk 20. Thus, since the hard disk 20 is rotating when data is recorded on or read from the recording region 22 of the hard disk 20, the magnetic head 50 glides a predetermined distance above the horizontal plane of the hard disk 20. Thus, scratches due to the friction between the recording region 22 and the magnetic head 50 do not occur on the recording region 22. However, if the rotation of the hard disk 20 completely stops, as when power is turned off, the lift force that lifts the magnetic head 50 disappears. Thus, the actuator 30 rotates so that the magnetic head 50 is positioned in the parking region 21 before the lift force disappears. As a result, the magnetic head 50 safely arrives in the parking region 21, which is not related to recording and/or reproducing data, and thus does not have a bad effect on the recording region 22 although the lift force disappears as the rotation of the hard disk 20 stops. However, if the magnetic head 50 is pushed toward the recording region 22 due to an impact after the magnetic region 50 safely arrives in the parking region 21, the magnetic head 50 keeps touching the recording region 22 until the magnetic head 50 is lifted again when the hard disk 20 is re-driven. As a result, scratches may occur on the recording region 22. Hence, in order to solve this problem, the actuator 30 is locked using the latch so that the actuator 30 does not rotate although the impact is inflicted.

However, with this conventional latch, the actuator 30 is locked by a magnetic force which couples the magnetic member 43 to the iron separation element 61. Thus, the actuator 30 is unlocked if a force greater than the electromagnetic force is applied. Also, the actuator 30 is unlocked and begins moving because the electromagnetic force generated between the movable coil 35 and the magnet 41 exceeds the combination force due to the magnetic force between the iron separation element 61 and the magnetic member 43 to re-rotate the locked actuator 30. And, if the magnetic combination force between the iron separation element 61 and the magnetic member 43 is too small, the actuator 30 is easily unlocked even by a small impact. In other words, if the magnetic combination force between the iron separation element 61 and the magnetic member 43 is too small, the actuator 30 is easily unlocked even by a small impact. If the magnetic combination force between the iron separation element 61 and the magnetic member 43 is too great, the actuator 30 may not be unlocked even if the maximum electromagnetic force occurs to rotate the actuator 30. In the above-described structure, the actuator 30 springs out sharply due to inertia when the actuator 30 is unlocked by overcoming the magnetic combination force. Thus, the protrusion 36 may strongly crash against a stopper 42 opposite to the magnetic member 43. If the actuator 30 crashes against the stopper 42, head slap may occur due to the crash impact. Thus, to prevent the head slap, the application of current to the movable coil is controlled so that the actuator 30 is unlocked and supplied with a damping force. It is difficult to design a control system since the timing to unlock the actuator 30 and supply the damping force to the actuator 30 is accurately set. Also, due to repetitive locking and unlocking operations, the damper 60 is under continuous stress and it may be destroyed.

U.S. Pat. No. 4,692,829 discloses a locking structure adopting an aerodynamic latch member, not a locking structure by the magnetic force combination of an iron separation element and a magnetic member to inhibit a problem of head slap. In this locking structure, the aerodynamic latch member moves and an actuator is locked and unlocked due to wind occurring when a disk rotates. However, the sensitivity of moving the aerodynamic latch member must be accurate due to the strength of wind occurring when the disk rotates to prevent operation errors. Thus, an error in manufacturing and assembling the aerodynamic latch member should be minimized and a great burden is given in manufacturing the aerodynamic latch member.

SUMMARY OF THE INVENTION

Accordingly, it is an object of the present invention to provide a magnetic head of a hard disk drive having an improved structure to strongly keep an actuator locked and softly perform operations of locking and unlocking.

Additional objects and advantages of the invention will be set forth in part in the description which follows and, in part, will be obvious from the description, or may be learned by practice of the invention.

The foregoing and other objects of the present invention are achieved by providing an actuator latch of a hard disk drive to lock an actuator so that the actuator does not rotate when a magnetic head installed at the actuator driven by a voice coil motor is positioned on a parking region. The actuator latch comprises: a locking protrusion installed at the actuator; a latch member rotatably installed on the basis of a predetermined rotation axis, the latch member to rotate with the rotation of the actuator when the magnetic head is parked so that a hook intercepts the locking protrusion and prevents it from moving in an opposite direction to a parking side; and a latch member driving unit including a lever installed at the latch member to be joined with a yoke of the voice coil motor by a magnetic force when intercepting the moving path of the locking protrusion and a coil to form the same polarity as the yoke with current supplied by a power supply installed at the level, the latch member driving unit to rotate the latch member to set free the interception of the movement path of the locking protrusion by the hook.

BRIEF DESCRIPTION OF THE DRAWINGS

These and other objects and advantages of the invention will become apparent and more readily appreciated from the following description of the embodiments, taken in conjunction with the accompanying drawings of which.

DETAILED DESCRIPTION OF THE INVENTION

Figure 1:
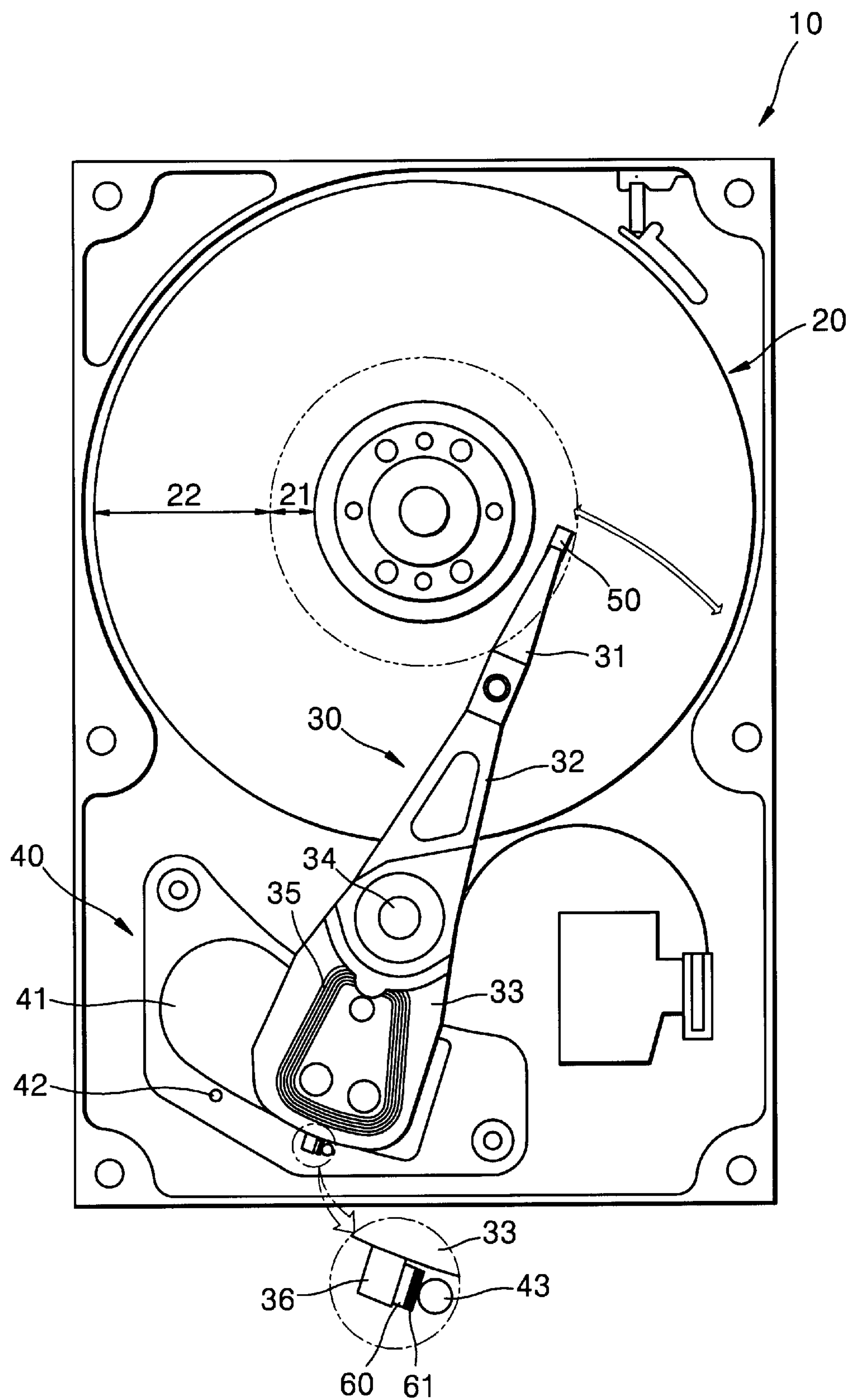
FIG. 1 is a plan view of a hard disk drive including a conventional actuator latch.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
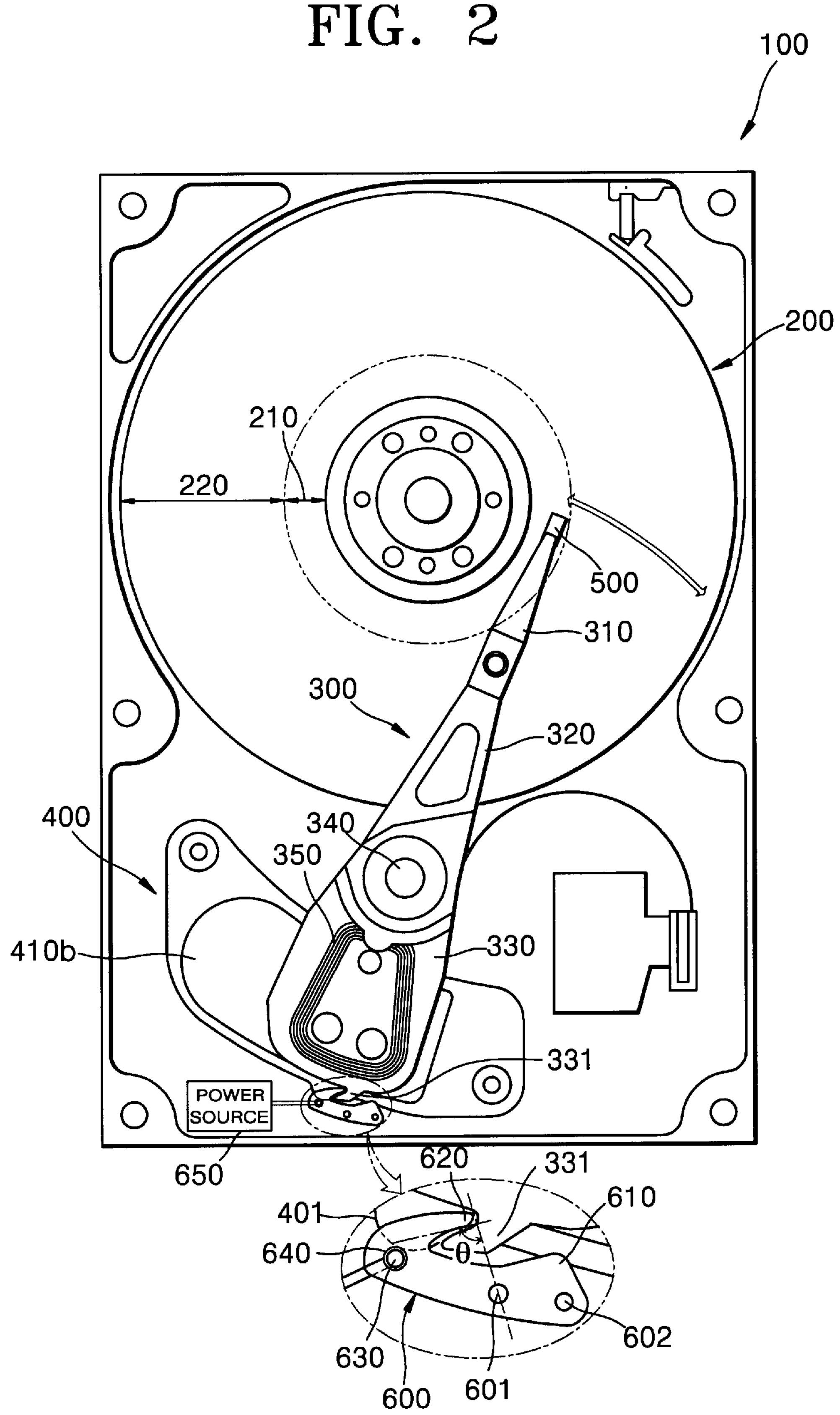
FIG. 2 is a plan view of hard disk drive including an actuator latch according to an embodiment of the present invention.
Figure 3:
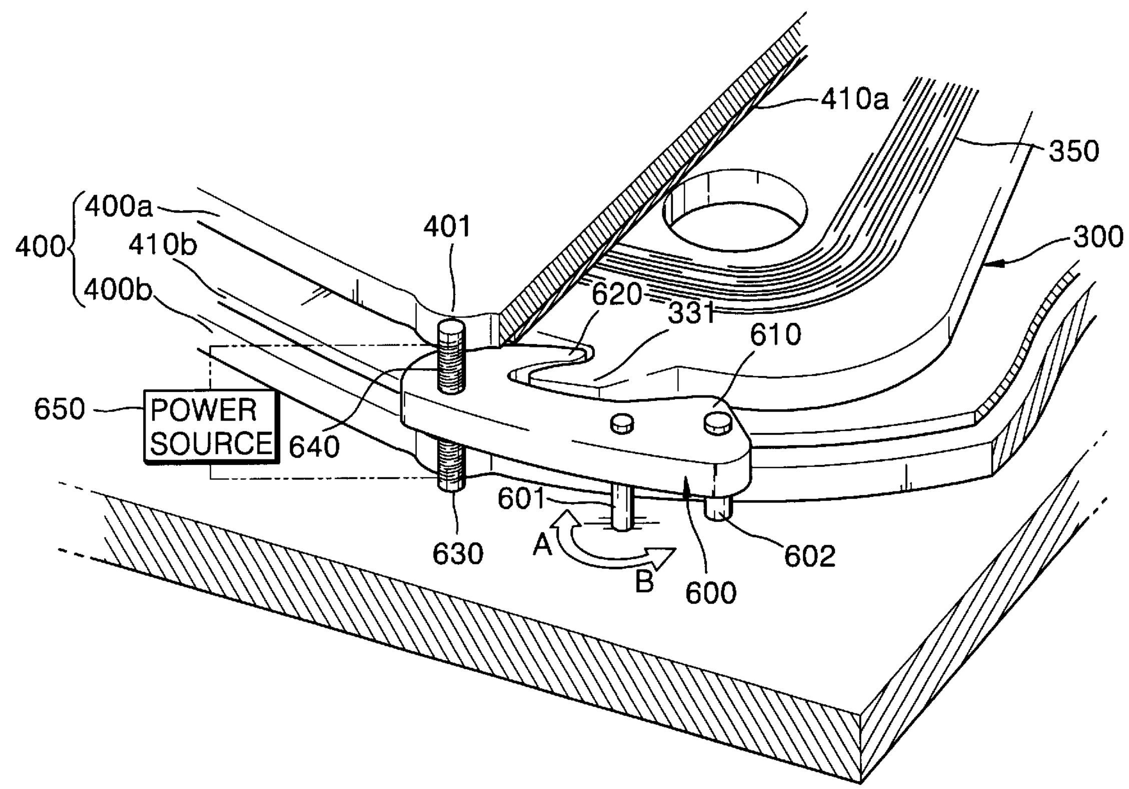
FIG. 3 is a perspective view of a portion of the actuator latch shown in FIG. 2.

FIGS. 2 and 3 show a hard disk drive including an actuator latch according to an embodiment of the present invention. Referring to FIG. 2, a magnetic head transfer mechanism includes an actuator 300 and a voice coil motor. The actuator 300 has a magnetic head 500 at an end thereof installed on a base 100, on which a disk 200 is rotatably installed. The voice coil motor rotates the actuator 300 so that the magnetic head 500 moves in a parking region 210 and a recording region 220 on the disk 200. Here, the actuator 300 includes a suspension portion 310, an arm 320, and a bobbin 330. The suspension portion 310 suspends the magnetic head 500. The arm 320 is coupled to a rotation axis 340 on the base 100. A movable coil 350 of the voice coil motor is wound around the bobbin 330. The voice coil motor includes the movable coil 350 and magnets 410*a* and 410*b*. The magnets 410*a* and 410*b* are installed on a yoke 400 on the base 100 and generate magnetic flux. As shown in FIG. 3, the actuator 300 lies between the upper and lower yokes and magnets 410*a* and 410*b*. Thus, upper and lower magnets 410*a* and 410*b* form magnetic poles on upper and lower yokes 400*a* and 400*b*. Reference numeral 401 represents a connecting portion of the upper yoke 400*a*, where a lever 630 of a latch member 600, to be described later, is selectively attached to and detached from.

When the magnetic head 500 is positioned in the parking region 210 of the disk 200, a locking mechanism locks the actuator 300. The locking mechanism includes the latch member 600, a coil 640, and a power supply 650. The latch member 600 includes a locking protrusion 331 at the actuator 300, a hook 620, an impact portion 610, and the lever 630, and rotates on the basis of a rotation axis 601. The coil 640 is wound around the lever 630. The power supply 650 supplies the coil 640 with current. The lever 630 is formed of a metallic material having a magnetic polarity due to a short via the coil 640. The magnetic polarity reacts with the magnetic poles formed on the upper yoke 400*a* and serves as a driving force to rotate the latch member 600 if necessary. The impact portion 610 crashes against the locking protrusion 331, and is pushed when the actuator 300 rotates in a direction along which the magnetic head 500 enters the parking region 210 of the disk 200 so that the latch member 600 rotates simultaneously. In other words, the latch member 600 rotates with the rotation of the actuator 300 toward the parking side of the disk 200. As the latch member 600 rotates with the rotation of the actuator 300 toward the parking side of the disk 200, the hook 620 intercepts it in an opposite direction to the locking protrusion 331. In other words, the hook 620 prevents the locking protrusion 331 from returning to an opposite direction to the parking direction to lock the actuator 300. Reference numeral 602 represents an iron separation element installed opposite to the lever 630 on the basis of the rotation axis 601. The iron separation element 602 receives an attraction force from the magnets 410*a* and 410*b* of the voice coil motor and the yoke 400 to keep the actuator 300 unlocked.

Figure 4:
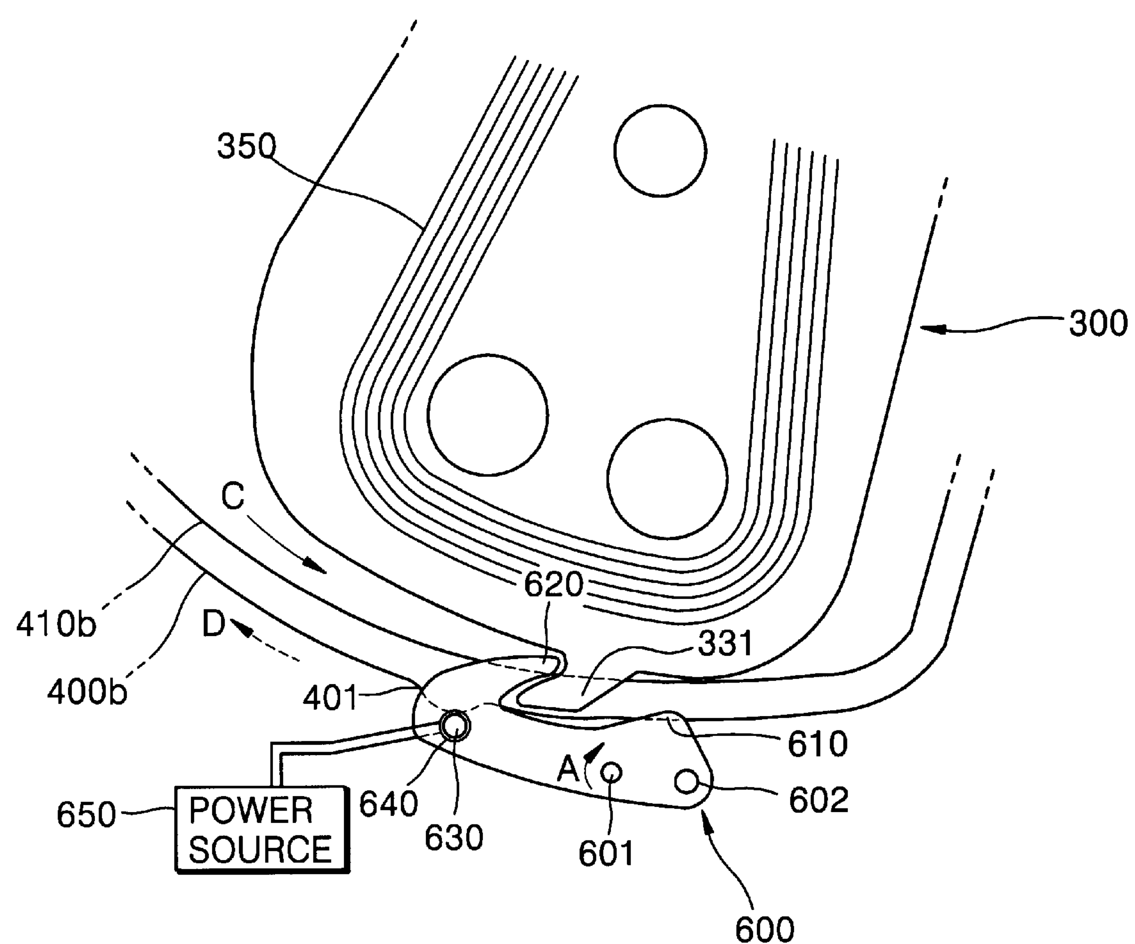
FIG. 4 is a plan view explaining locking the actuator latch shown in FIG. 2.

In the above-described structure, if the disk 200 stops rotating when power is turned off, an electromagnetic force occurs due to the interaction between current flowing through the movable coil 350 and the magnetic flux generated from the magnet 410. Thus, as shown in FIG. 4, the actuator 300 rotates in direction C so that the magnetic head 500 enters the parking region 210 of the disk 200. Here, the locking protrusion 331 pushes the impact portion 610 of the latch member 600 and rotates the latch member 600 in direction A. As a result, both ends of the lever 630, which is perpendicular to the latch member 600, are connected with the connecting portions 401 of the upper and lower yokes 400*a* and 400*b* at the same time by a magnetic force (Refer to FIG. 3), and the hook 620 is located at a position to intercept a moving path of the locking protrusion 331 in a D direction, i.e., an opposite direction to the parking direction. As shown in FIG. 2, it is preferable that a contact surface between the locking protrusion 331 and the hook 620 is formed at a right or obtuse angle which forms an angle of 90° or more with a segment linking the end of the hook 331 and the rotating axis 601. Then, since the locking protrusion 331 does not slide from the contact surface, the actuator 300 can securely remain locked. Thus, the locking protrusion 331 does not come off the hook 620 as long as the hook 620 is in the intercepting position. As a result, the actuator 300 remains stably locked after the magnetic head 300 is positioned on the parking region 210 of the disk 200.

Figure 5:
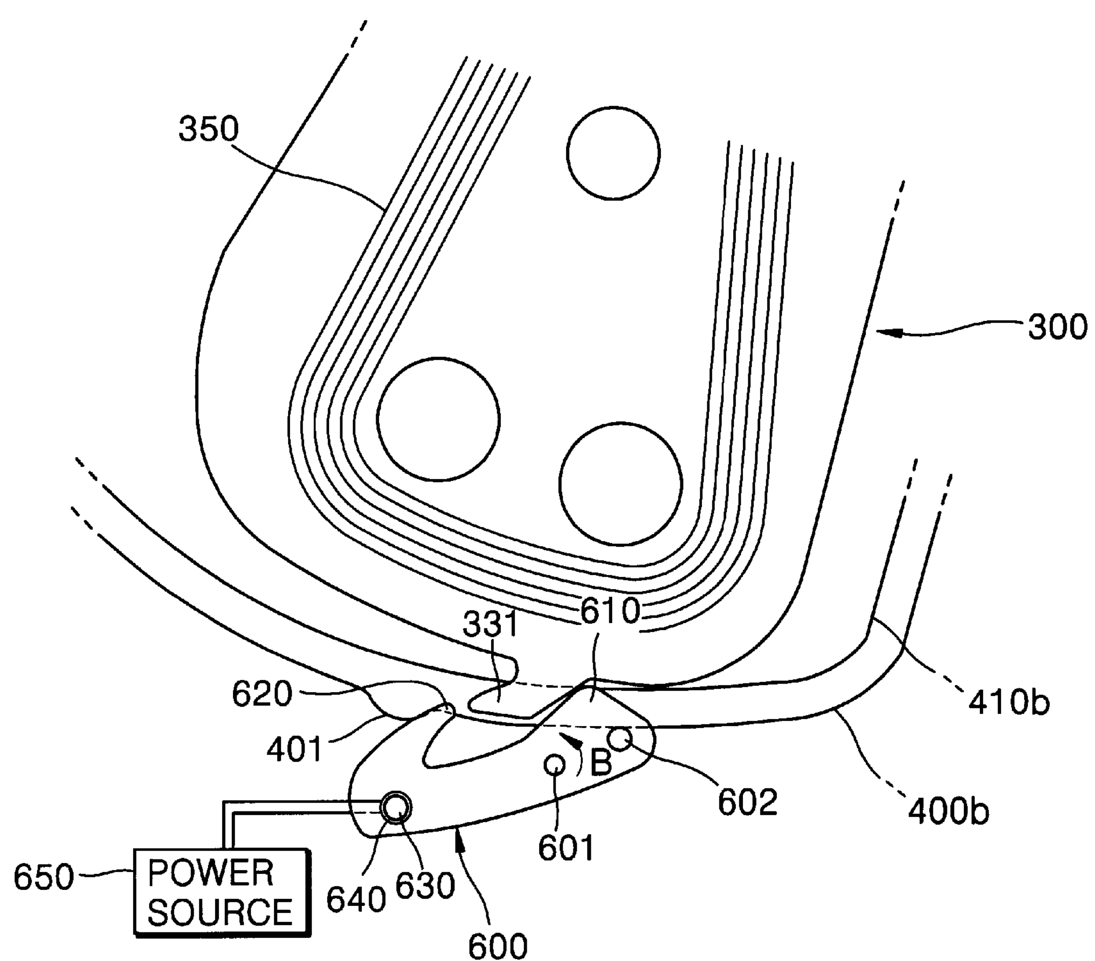
FIG. 5 is a plan view explaining unlocking the actuator latch shown in FIG. 2.

If the actuator 300 is unlocked to refuse the hard disk 200, the power supply 650 supplies the coil 640 with current to form the same polarity as the connecting portion 401 at an end of the lever 630 contacting the connecting portion 401. Thus, as shown in FIG. 5, the latch member 600 rotates in direction B, and the hook 620 is released from the locking protrusion 331. As a result, the actuator 300 is unlocked and thus rotates freely so that the magnetic head 500 is transferred to the recording region 220 of the disk 200. It is preferable that current flowing through the coil 640 stops to reduce current consumption after the actuator 300 is completely unlocked. Nevertheless, since the iron separation element 602 installed on the latch member 600 receives an attraction force from the magnets 410*a* and 410*b* of the voice coil motor and the yoke 400, the lever 630 does not come in contact with the connecting portion 401 as long as a predetermined external force is not applied.

Accordingly, the actuator latch according to the present invention is locked and unlocked when the hook 620 of the latch member 600 moves to a position to restrict the movement of the locking protrusion 331 of the actuator 300 or set the locking protrusion 331 of the actuator 300 free. Thus, the actuator latch is more softly and stably locked and unlocked than the conventional latch based on a magnetic combination. In other words, when the iron separation element 61 of FIG. 1 contacts the magnetic member 43 of FIG. 1 due to a magnetic force, the conventional latch comes apart from the magnetic member 43, and the locking protrusion 36 of FIG. 1 crashes against the stopper 42 of FIG. 1 due to inertia. Thus, the magnetic head 500 of FIG. 1 may be damaged. However, in the actuator latch of the present invention, if the latch member 600 rotates to set the locking protrusion 331 free, the actuator 300 can move freely. Thus, the actuator 300 is softly and stably unlocked. As a result, no impact occurs due to unlocking, and no structure to supply a damping force simultaneously performed while unlocking to prevent impact is required. Also, after the actuator 300 is locked, the actuator 300 does not move at all as long as the latch member 600 does not rotate to be unlocked. Thus, the actuator 300 can remain stably locked.

In this embodiment, the both ends of the lever 630 protrude over and under the latch member 600 and are connected with the conjunction portions 401 of the upper and lower yokes 400*a* and 400*b*. However, both ends of the lever 630 may be connected with only one of the upper and lower yokes 400*a* and 400*b*. In other words, any one end of the lever 630 may protrude to connect with the connection portions 401, and the other end of the lever 630 may be removed. However, as in this embodiment, if the both ends of the lever 630 are connected with the connection portions 401 of the upper and lower yokes 400*a* and 400*b*, locking is stably maintained. Also, since repulsive forces to unlock occur at the both ends of the lever 630, almost the same forces as the repulsive forces can be obtained although less current is supplied. Thus, the structure of the lever 630 may be more efficient.

As described above, in an actuator latch of a hard disk drive according to the present invention, the movement of a locking protrusion at an actuator is selectively intercepted so that the actuator is locked and unlocked. The actuator can remain stably locked and be softly unlocked without any impact.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An actuator latch of a hard disk drive to lock an actuator so that the actuator does not rotate when a magnetic head installed at the actuator driven by a voice coil motor is positioned in a parking region, the actuator latch comprising:

a locking protrusion installed at the actuator;

a latch member rotatably installed on a predetermined rotation axis, the latch member rotating with the rotation of the actuator when the magnetic head is parked so that a hook intercepts the locking protrusion and prevents the latch member from moving in an opposite direction to the parking direction; and a latch member driving unit including a lever installed at the latch member to join a yoke of the voice coil motor by a magnetic force when intercepting the moving path of the locking protrusion and a coil to form the same polarity as the yoke with current supplied by a power supply installed at the lever, the latch member driving unit rotating the latch member to set free the interception of the movement path of the locking protrusion by the hook.

2. The actuator latch of claim 1, further comprising an iron separation element positioned at the latch member at a side opposite to the lever to receive an attractive force from the voice coil motor.

3. The locking mechanism of claim 2, wherein once the iron separation element receives an attraction force from a voice coil motor, the lever does not come into contact with a connection portion unless a predetermined external force is applied to the lever.

4. The actuator latch of claim 1, wherein the latch member comprises an impact portion, which crashes against the locking protrusion when the actuator rotates in a parking direction.

5. The actuator latch of claim 1, wherein the latch member comprises a contact surface between the locking protrusion and the hook at a right or obtuse angle to form an angle of 90° or more with a segment linking the end of the hook and the rotating axis.

6. The actuator latch of claim 1, further comprising an iron separation element positioned at the latch member at a side opposite to the lever to receive an attractive force from the voice coil motor to keep the actuator unlocked.

7. A locking mechanism used with a hard disk drive having a disk and an actuator with a magnetic head installed at the actuator driven by a voice coil motor, the locking mechanism comprising:

a locking protrusion installed at an end of the actuator;

a latch member having a hook and rotatably installed on a rotation axis to rotate when the actuator rotates toward a parking region of the disk, the hook intercepting the locking protrusion and preventing the actuator from moving away from the parking region of the disk; and a latch member driving unit to rotate the latch member in a first direction by attracting the hook toward the locking protrusion with a magnetic force when intercepting the moving path of the locking protrusion and rotating the latch member in an opposite direction from the first direction to remove the hook from interception of the moving path of the locking protrusion.

8. The locking mechanism of claim 7, wherein the latch member driving unit comprises:

a lever positioned at one end of the latch member and having a magnetic force to attract the hook into the moving path of the locking protrusion and to repel the hook away from the moving path of the locking protrusion.

9. The locking mechanism of claim 8, wherein the latch member driving unit further comprises:

an iron separation unit to be attracted toward the actuator to keep the hook away from the moving path of the locking protrusion when the hook is repelled from the moving path of the locking protrusion.

10. The locking mechanism of claim 9, wherein the lever and the iron separation element are magnetically attracted to a yolk of the voice coil motor.

11. The locking mechanism of claim 8, wherein the lever comprises a coil wound thereon to receive current from a power source to create a magnetic force on the lever.

12. The locking mechanism of claim 11, wherein the lever protrudes over and under the latch member.

13. The locking mechanism of claim 12, wherein the lever is formed of a metallic material having a magnetic polarity due to a short via the coil.

14. The actuator latch of claim 12, wherein the voice coil motor comprises first and second yokes each having first and second connection portions, respectively, positioned such that the lever connects with the first and second connection portions when the hook is attracted to the locking protrusion.

15. The locking mechanism of claim 11, wherein the lever protrudes over or under the latch member.

16. The actuator latch of claim 15, wherein the voice coil motor comprises first and second yokes each having first and second connection portions, respectively, positioned such that the lever connects with one of the first and second connection portions when the hook is attracted to the locking protrusion.

17. The locking member of claim 7, wherein the latch member further comprises an impact portion positioned on an opposite side from the hook to engage with the locking protrusion when the actuator rotates toward a parking region of the disk to rotate the latch member such that the hook intercepts the moving path of the locking protrusion.

* * * * *